United States Patent
Ishitsu et al.

(10) Patent No.: US 12,458,307 B2
(45) Date of Patent: Nov. 4, 2025

(54) RADIATION IMAGING DEVICE

(71) Applicant: FUJIFILM Healthcare Corporation, Kashiwa (JP)

(72) Inventors: Takafumi Ishitsu, Kashiwa (JP); Isao Takahashi, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 276 days.

(21) Appl. No.: 18/140,691

(22) Filed: Apr. 28, 2023

(65) Prior Publication Data

US 2024/0023912 A1     Jan. 25, 2024

(30) Foreign Application Priority Data

Jul. 22, 2022   (JP) .................................. 2022-117116

(51) Int. Cl.
    *A61B 6/42*    (2024.01)
(52) U.S. Cl.
    CPC .................................. *A61B 6/4241* (2013.01)
(58) Field of Classification Search
    CPC .................................................... A61B 6/4241
    See application file for complete search history.

(56) References Cited

U.S. PATENT DOCUMENTS

| | | | | |
|---|---|---|---|---|
| 6,747,697 | B1 * | 6/2004 | Lin | G06T 5/20 348/610 |
| 8,824,628 | B2 * | 9/2014 | Dolazza | G06T 11/005 378/22 |
| 8,913,711 | B2 * | 12/2014 | Moriyasu | A61B 6/032 378/7 |
| 10,080,533 | B2 * | 9/2018 | Roessl | A61B 6/405 |
| 10,751,020 | B2 | 8/2020 | Konno | |
| 2002/0123694 | A1 * | 9/2002 | Organ | A61B 5/0536 73/1.01 |
| 2005/0220268 | A1 * | 10/2005 | Fujii | G01T 1/2928 378/114 |
| 2006/0262147 | A1 * | 11/2006 | Kimpe | G09G 3/20 345/690 |

(Continued)

FOREIGN PATENT DOCUMENTS

JP        2017-153547 A    9/2017

*Primary Examiner* — Blake C Riddick
(74) *Attorney, Agent, or Firm* — Paul Teng

(57) ABSTRACT

To provide a radiation imaging device which, even when a subpixel fails during operation of the photon counting detector, can correct an output signal of the pixel including the failed subpixel. A radiation imaging device that has a photon counting detector to count radiation photons and can correct an output signal of a pixel including a failed subpixel even if the subpixel fails during operation of the photon counting detector. The photon counting detector comprises: a pixel comprised of a plurality of subpixels; a data processing section that calculates an output signal of the pixel according to the number of radiation photons counted in each of the subpixels; and a failure detection section that detects a failure of the subpixel according to the number of radiation photons counted in the subpixel and outputs the position of the failed subpixel. The radiation imaging device further comprises a data correction section that generates correction data for the pixel including the failed subpixel according to the position of the failed subpixel.

8 Claims, 4 Drawing Sheets

(56) References Cited

U.S. PATENT DOCUMENTS

| | | | |
|---|---|---|---|
| 2007/0076848 A1* | 4/2007 | Walter | A61B 6/032 378/98.8 |
| 2007/0248209 A1* | 10/2007 | Hoffman | A61B 6/032 378/19 |
| 2008/0298541 A1* | 12/2008 | Mattson | A61B 6/585 378/19 |
| 2008/0304618 A1* | 12/2008 | Hoffman | G01T 1/2928 378/5 |
| 2009/0129538 A1* | 5/2009 | Tkaczyk | G01T 1/249 250/361 R |
| 2010/0193697 A1* | 8/2010 | Bal | G01T 1/249 250/371 |
| 2010/0282972 A1* | 11/2010 | Carmi | G01T 1/2928 250/362 |
| 2011/0210262 A1* | 9/2011 | Prendergast | G01T 1/24 250/394 |
| 2013/0022258 A1* | 1/2013 | Lee | G06T 5/70 382/132 |
| 2013/0202086 A1* | 8/2013 | Tsuji | H05G 1/44 378/62 |
| 2014/0270440 A1* | 9/2014 | Inglese | A61B 6/482 382/131 |
| 2015/0146849 A1* | 5/2015 | Kang | A61B 6/4233 378/62 |
| 2015/0198725 A1* | 7/2015 | Tamura | G01T 1/17 378/5 |
| 2015/0250443 A1* | 9/2015 | Petschke | G06T 7/0012 378/5 |
| 2016/0245934 A1* | 8/2016 | Shahar | G01T 7/005 |
| 2016/0266054 A1* | 9/2016 | Cao | G01T 1/247 |
| 2016/0354048 A1* | 12/2016 | Lee | G21K 5/04 |
| 2017/0119340 A1* | 5/2017 | Nakai | A61B 6/50 |
| 2017/0261620 A1* | 9/2017 | Kato | G01T 1/171 |
| 2017/0269240 A1* | 9/2017 | Shahar | G01T 1/249 |
| 2017/0276808 A1* | 9/2017 | Takahashi | G01T 1/2985 |
| 2017/0322319 A1* | 11/2017 | Iniewski | G01T 1/24 |
| 2017/0345134 A1* | 11/2017 | Cresens | G06T 5/77 |
| 2018/0061097 A1* | 3/2018 | Yokoi | A61B 6/5205 |
| 2018/0317868 A1* | 11/2018 | Terui | A61B 6/482 |
| 2018/0328783 A1* | 11/2018 | Nishihara | H04N 25/618 |
| 2019/0029628 A1* | 1/2019 | Konno | A61B 6/542 |
| 2019/0050970 A1* | 2/2019 | Cresens | G06T 5/77 |
| 2019/0094391 A1* | 3/2019 | Nishihara | A61B 6/032 |
| 2019/0310384 A1* | 10/2019 | Kok | G01T 1/243 |
| 2019/0374182 A1* | 12/2019 | Karim | A61B 6/4241 |
| 2020/0138386 A1* | 5/2020 | Zimmerman | G06T 7/62 |
| 2020/0252562 A1* | 8/2020 | Umekawa | A61B 6/586 |
| 2020/0278461 A1* | 9/2020 | Yokoi | G01T 1/171 |
| 2021/0063589 A1* | 3/2021 | Iniewski | G01T 7/005 |
| 2021/0212646 A1* | 7/2021 | Yokoi | G01T 1/247 |
| 2022/0229196 A1* | 7/2022 | Zhan | A61B 6/035 |
| 2023/0069062 A1* | 3/2023 | Fujito | A61B 6/5217 |

* cited by examiner

RADIATION IMAGING DEVICE

CROSS REFERENCE TO RELATED APPLICATION

The present application claims priority from Japanese Patent Application JP 2022-117116 filed on Jul. 22, 2022, the content of which is hereby incorporated by reference into this application.

BACKGROUND OF THE INVENTION

The present invention relates to a radiation imaging device with a photon counting detector and more particularly to failure detection and correction in a photon counting detector.

The development of a PCCT (Photon Counting Computed Tomography) device, as a radiation imaging device with a photon counting detector as a detector that adopts a photon counting method, is in progress. The photon counting detector counts the number of radiation photons and can measure the energies of individual radiation photons, so the PCCT device can provide a medical image that includes more information than the conventional CT device, for example, a medical image which is divided into a plurality of energy components.

However, as the number of radiation photons incident on a pixel in the photon counting detector per unit time increases, a failure to perform counting occurs, so there are cases that a pixel is divided into a plurality of subpixels and the sum of radiation photons counted in each subpixel is used as an output signal of each pixel. In addition, if some of the subpixels fail, the output signal of the pixel including the failed subpixels is estimated according to the number of radiation photons in the subpixels that have not failed.

Japanese Patent Unexamined Publication No. 2017-153547 discloses that in order to estimate an output signal of a pixel including a failed subpixel with high accuracy, the addition ratio for each subpixel that is used for weighted addition of the number of radiation photons in each subpixel is determined according to the position of the failed subpixel.

SUMMARY OF THE INVENTION

However, in Japanese Patent Unexamined Publication No. 2017-153547, correction is made for a previously recorded failed subpixel and thus it is difficult to deal with a case that a subpixel fails during operation of the photon counting detector.

Therefore, the present invention has an object to provide a radiation imaging device which, even when a subpixel fails during operation of the photon counting detector, can correct an output signal of the pixel including the failed subpixel.

In order to achieve the above object, a radiation imaging device has a photon counting detector that counts the number of radiation photons, in which the photon counting detector comprises: a pixel comprised of a plurality of subpixels; a data processing section that calculates an output signal of the pixel according to the number of radiation photons counted in each of the subpixels; and a failure detection section that detects a failure of the subpixel according to the number of radiation photons counted in the subpixel and outputs the position of the failed subpixel. The radiation imaging device further comprises a data correction section that generates correction data for the pixel including the failed subpixel according to the position of the failed subpixel.

According to the present invention, the radiation imaging device can be provided which corrects the output signal of the pixel including the failed subpixel even if a subpixel fails during operation of the photon counting detector.

DETAILED DESCRIPTION OF THE PREFERRED EMBODIMENTS

Figure 1:
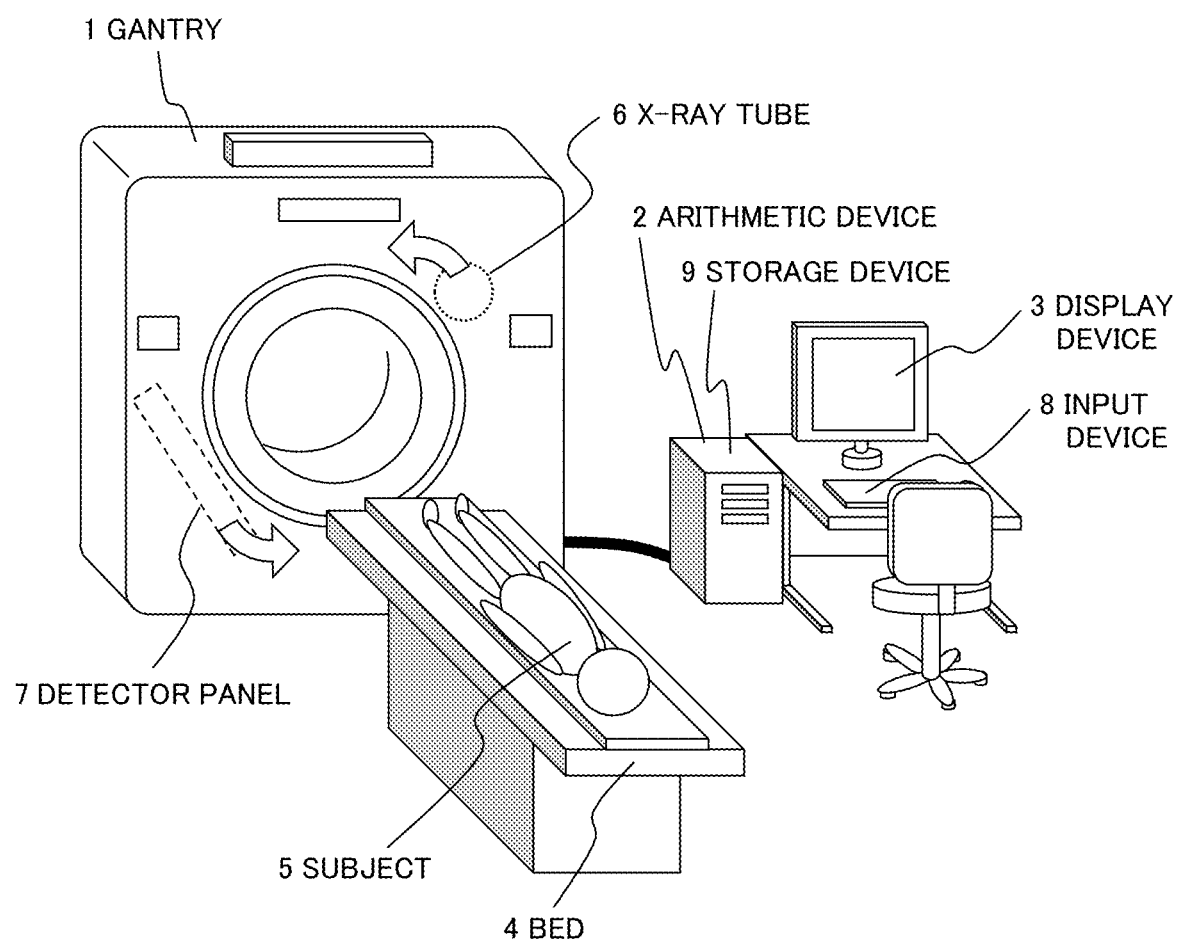
FIG. 1 is a view that shows the general configuration of an X-ray CT device according to a first embodiment.

Hereinafter, an embodiment of the present invention is explained referring to the drawings. The radiation imaging device according to the present invention is applied to a device that has a radiation source and a photon counting detector. An explanation is made below of an example in which the radiant rays are X rays and the radiation imaging device is an X-ray CT device.

First Embodiment

FIG. 1 shows the general configuration of an X-ray CT device according to the first embodiment. The X-ray CT device is a device that includes a gantry 1, an arithmetic device 2, a display device 3, and a bed 4 and counts the X-ray photons absorbed by a subject 5 lying on the bed 4 to generate a tomographic image of the subject 5 according to the count. Hereinafter the constituent elements are described.

The gantry 1 includes a rotating part which rotates with an X-ray tube 6 and a detector panel 7 mounted on it, and a stationary part which supports the rotating part. The X-ray tube 6 generates X rays by letting the electrons accelerated at high voltage of about 100 kV hit a target. The detector panel 7, which is installed in a manner to face the X-ray tube 6 with the subject 5 between them, counts the X-ray photons transmitted through the subject 5 to measure the spatial distribution of X-ray photons. By subtracting the number of X-ray photons transmitted through the subject 5 from the number of X-ray photons without the subject 5, the number of X-ray photons absorbed by the subject 5 is calculated and acquired as projection data. Since the detector panel 7 is a photon counting detector that can measure the energy of X-ray photons, projection data for each energy component can be acquired. The details of the detector panel 7 will be described later referring to FIG. 2.

While the X-ray tube 6 and detector panel 7 are rotating around the subject 5, the irradiation of the subject 5 with X rays by the X-ray tube 6 and the counting of X-ray photons by the detector panel 7 are repeated so that projection data of the subject 5 in different directions is acquired. Projection data is acquired about 3000 times per second and sent to the arithmetic device 2. The bed 4 moves horizontally toward the opening of the gantry 1 in order to adjust the position of the subject 5 whose projection data is to be acquired.

The arithmetic device 2 has the same hardware configuration as an ordinary computer. It includes a CPU (Central Processing Unit) and a memory and is connected to a display device 3, an input device 8, and a storage device 9. The arithmetic device 2 generates a tomographic image by image reconstruction using a plurality of transmitted projection data and controls various components. For example, the arithmetic device 2 controls the voltage applied to the X-ray tube 6, the rotation speed of the X-ray tube 6 and detector panel 7 and so on.

The display device 3 is a liquid crystal display or touch panel, or the like, and displays a generated tomographic image or the like. The input device 8 is a keyboard and a mouse or the like and used to set the voltage to be applied to the X-ray tube 6. If the display device 3 is a touch panel, the touch panel functions as the input device 8. The storage device 9 is an HDD (Hard Disk Drive), SSD (Solid State Drive) or the like and stores the program to be executed by the CPU and various data such as projection data and tomographic images.

Figure 2:
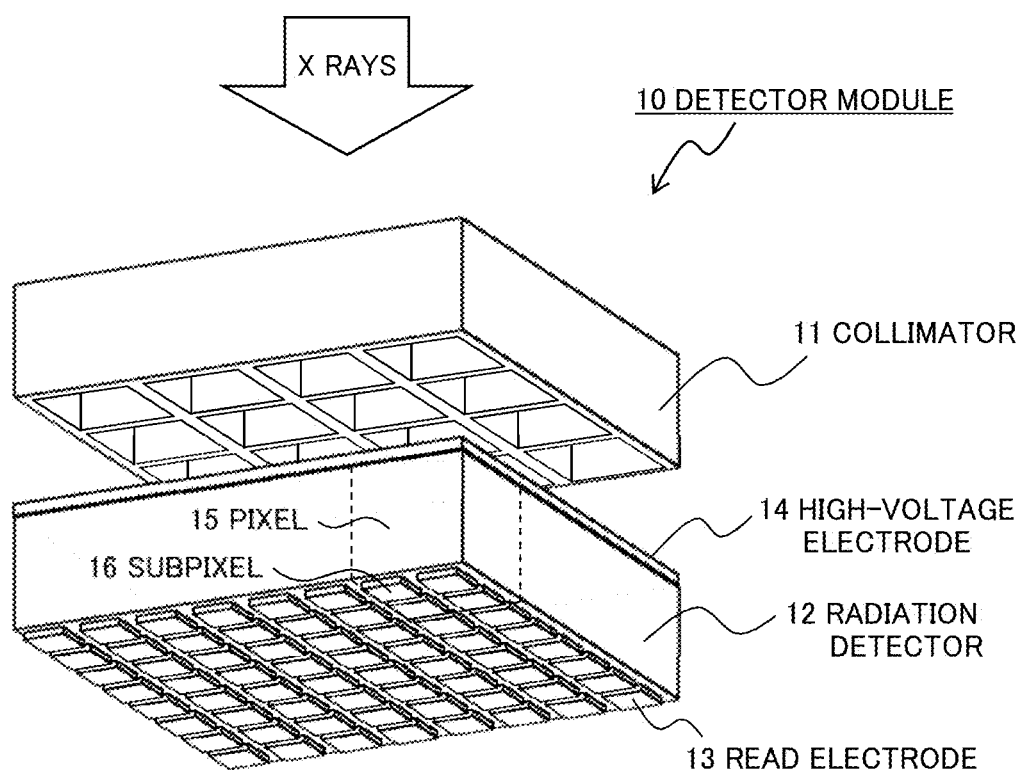
FIG. 2 is a view that shows the structure of the detector panel according to the first embodiment.

Next, an example of the detector panel 7 is described referring to FIG. 2. The detector panel 7 has a structure in which a plurality of detector modules 10 are arranged in an arc-like manner with the X-ray tube 6 as the center and is mounted on the rotating part of the gantry 1. The detector module 10 includes a radiation detector 12 and a collimator 11.

The collimator 11 is a metal grid with a plurality of holes and is installed between the radiation detector 12 and the subject 5 in order to prevent the scattered rays generated from the subject 5 from entering the radiation detector 12. For the collimator 11, a metal which is large in specific gravity and atomic number, such as tungsten or molybdenum, is used. The positions of the holes of the collimator 11 are adjusted so that the holes correspond to the pixels 15 of the radiation detector 12.

The radiation detector 12 is a semiconductor detector that detects the X-ray photons transmitted through the subject 5. For the radiation detector 12, CdTe or CdZnTe is used and a high-voltage electrode 14 is provided on the side where X rays are incident and a plurality of read electrodes 13 are provided on the opposite side. While the read electrodes 13 have a ground voltage, a negative high voltage is applied to the high-voltage electrode 14 and an electric field is generated between the high-voltage electrode 14 and the read electrodes 13. As X-ray photons enter the radiation detector 12, electrons and holes, the number of which corresponds to the energy of the X-ray photons, are generated. The electrons generated by the incidence of X-ray photons are moved to the nearest read electrode 13 by the electric field between the electrodes and read out as a charge signal. In order to reduce the possibility of failing to count X-ray photons, a plurality of read electrodes 13 are arranged in one pixel 15. In other words, the read electrodes 13 correspond to the subpixels 16 in the radiation detector 12. FIG. 2 shows an example in which one pixel 15 is divided into four subpixels 16.

Figure 3:
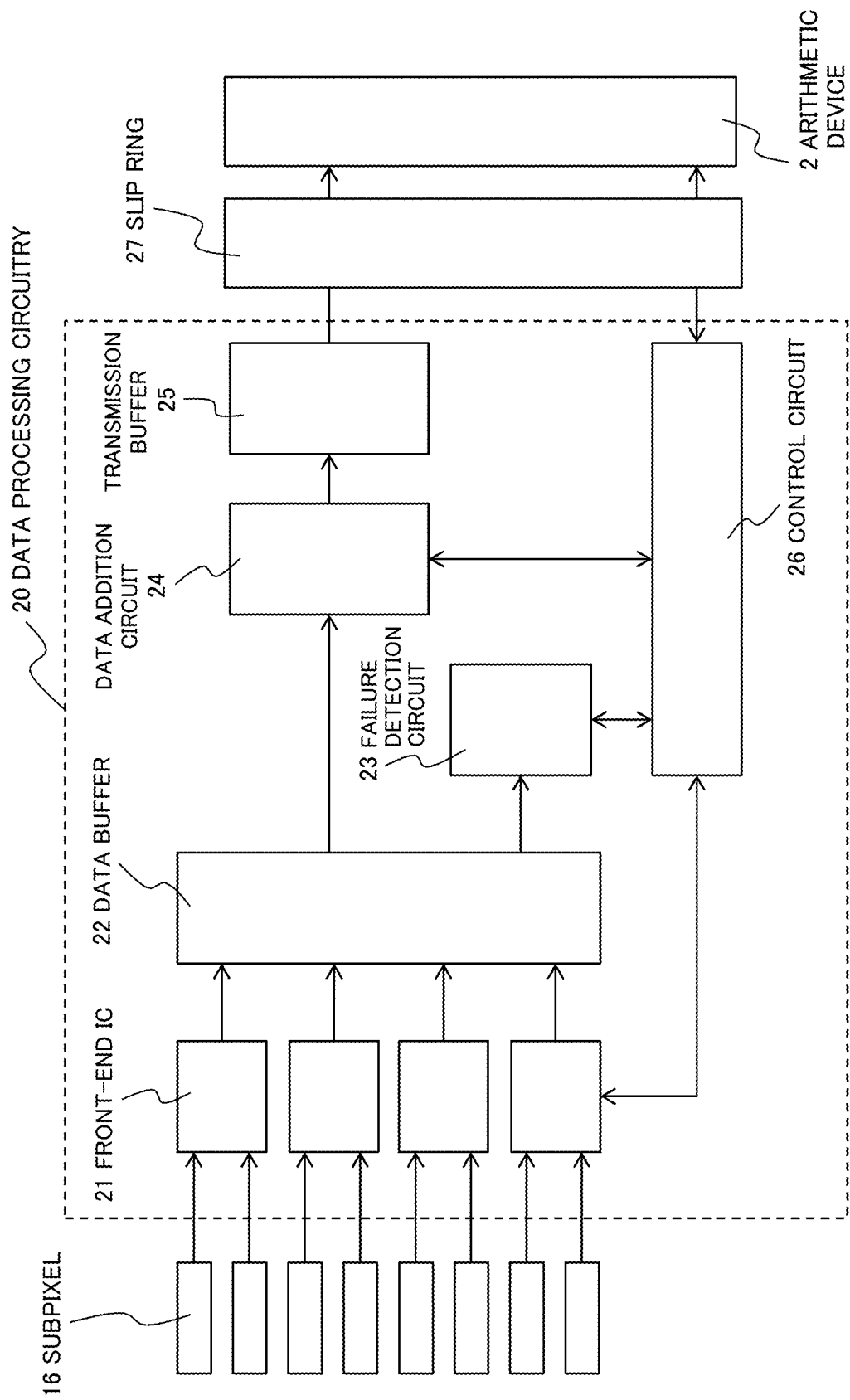
FIG. 3 is a diagram that shows the structure of the data processing circuitry according to the first embodiment.

Next, the data processing circuitry 20 for detection of X-ray photons is described referring to FIG. 3. The data processing circuitry 20 is connected to a subpixel 16 corresponding to a read electrode 13 and after performing various types of processing on the charge signal sent from the subpixel 16, sends the processed signal to the arithmetic device 2 through a slip ring 27. The data processing circuitry 20 includes a front-end IC 21, a data buffer 22, a failure detection circuit 23, a data addition circuit 24, a transmission buffer 25, and a control circuit 26.

Figure 4:
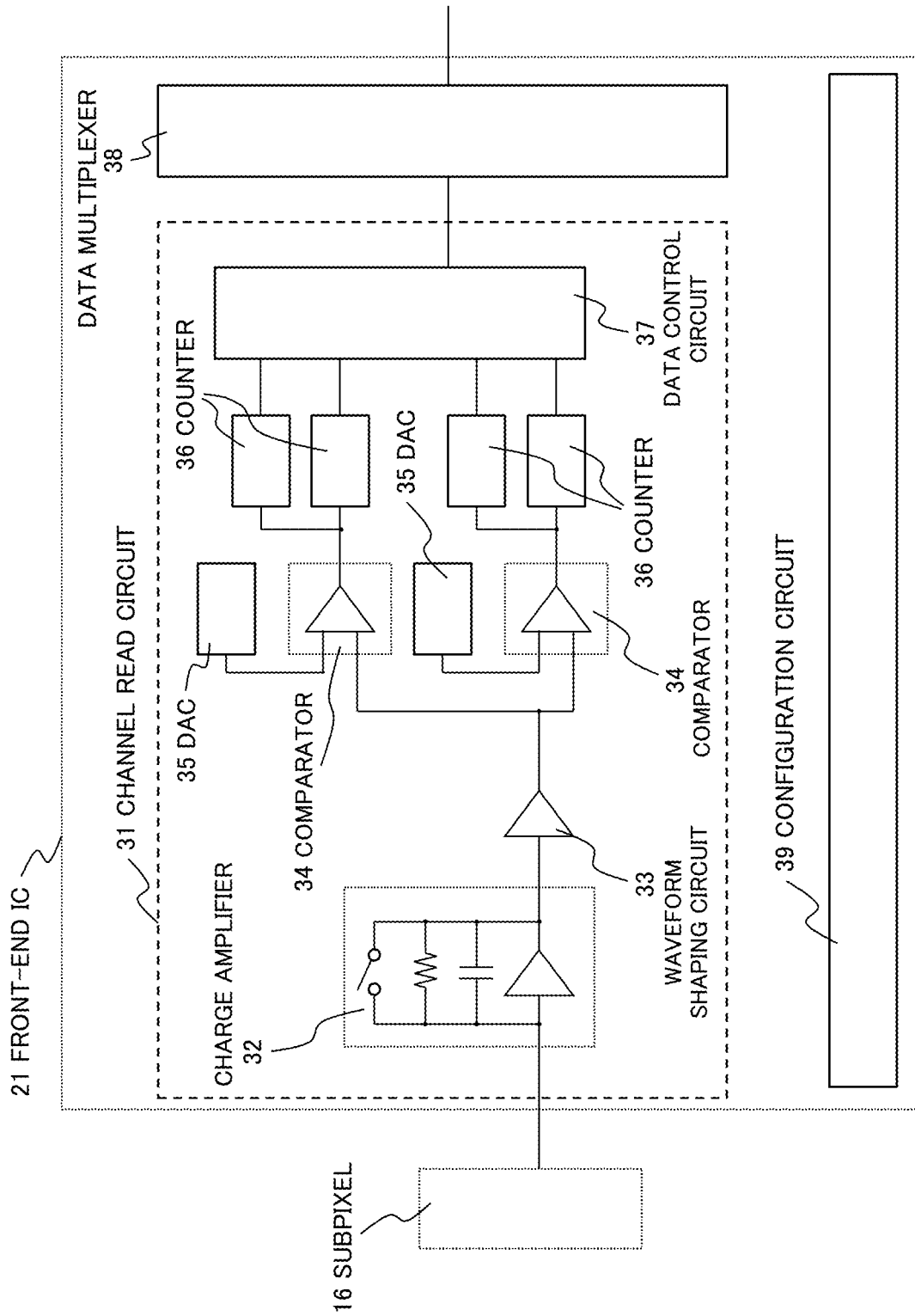
FIG. 4 is a diagram that shows the structure of the front-end IC according to the first embodiment.

A plurality of front-end ICs 21 are mounted on a board. Each front-end IC 21 amplifies and counts the charge signal read by the read electrode 13 and sends it to the data buffer 22 as digital data. Next, the front-end IC 21 is described referring to FIG. 4. The front-end IC 21 includes a channel read circuit 31, a data multiplexer 38, and a configuration circuit 39. The channel read circuit 31 includes a charge amplifier 32, a waveform shaping circuit 33, a comparator 34, a DAC 35, a counter 36, and a data control circuit 37, and counts the radiation photons for each energy according to the charge signal sent from the subpixel 16.

The charge amplifier 32 includes a capacitor for storing a charge signal, a switch for emitting a charge signal from the capacitor, and a resistor for stabilizing the operation, and outputs a voltage signal proportional to the charge signal to the waveform shaping circuit 33. If a subpixel 16 fails, the switch may be set to the short-circuit state to keep a stable potential or the switch may be set to the open state to use another switch for connection to the reference potential in order to prevent the noise caused by the failure from being mixed into another subpixel 16.

The waveform shaping circuit 33 is a bandpass filter for reducing the noise generated in the subpixel 16 or charge amplifier 32. The output voltage from the waveform shaping circuit 33 enters a plurality of comparators 34.

The DAC 35 is a digital-to-analog converter and outputs a voltage equivalent to a specified energy.

The comparator 34 compares the pulse height value of the output voltage from the waveform shaping circuit 33 with the output voltage from the DAC 35 and if the output voltage from the waveform shaping circuit 33 is higher, it outputs the pulse to the counter 36.

The counter 36 counts the pulses from the comparator 34. In other words, if the output voltage from the waveform shaping circuit 33 is higher than the voltage equivalent to the specified energy, the counter 36 counts the pulses. Since the DAC 35, comparator 34, and counter 36 are provided for each energy, radiation photons are counted for each energy. Two or more counters 36 may be connected to one comparator 34. When counting is performed while the counters 36 are switched from one to another, the dead time to change the view can be reduced.

The data control circuit 37 controls the switching of the counters 36 and the order of reading.

The data multiplexer 38 collectively outputs the number of radiation photons counted for each energy in each of the subpixels 16.

The configuration circuit 39 holds operation parameters such as the voltage of the DAC 35. The configuration circuit 39 may include a setting parameter to disable the channel read circuit 31.

Refer back to FIG. 3. The data buffer 22 temporarily stores the digital signals output from a plurality of front-end ICs 21 and outputs the signals to the failure detection circuit 23 and data addition circuit 24.

The failure detection circuit 23 detects a failure of the subpixel 16 according to the digital signal from the data buffer 22, namely the number of radiation photons counted in the subpixel 16. More specifically, if the number of radiation photons counted in the subpixel 16 is out of the normal range, a failure in the subpixel 16 is detected. The normal range may be predetermined for each tube voltage or tube current of X rays and, for example, it is stored as a table in the control circuit 26. When the normal range is determined for each tube voltage or tube current of X rays, a failure of the subpixel 16 can be detected during irradiation with X rays and so a failure can be detected with higher accuracy.

Alternatively, the normal range may be determined according to the number of radiation photons in several adjacent subpixels 16. When the normal range is determined according to the number of radiation photons in several adjacent subpixels 16, the need to store the normal range is eliminated, so the control for failure detection is simplified.

In addition, the normal range may be determined for the ratio of the number of radiation photons counted for each energy. When the normal range is determined for the ratio of the number of radiation photons counted for each energy, a failure related to measurement of the energy of radiation photons can be detected. Furthermore, a failure may be detected according to a noise signal when no irradiation is performed or a failure may be detected using another test signal source. The information on the position of the subpixel 16 in which a failure has been detected is given to the control circuit 26 and stored. In other words, the failure detection circuit 23 functions as a failure detecting section that detects a failure in the subpixel 16 according to the number of radiation photons counted in the subpixel 16 and outputs the position of the failed subpixel 16.

The data addition circuit 24 adds up the numbers of radiation photons in the subpixels 16 included in the pixel 15 and writes the value after the addition, in the transmission buffer 25. In other words, the data addition circuit 24 functions as a data processing section that calculates an output signal of the pixel 15 according to the number of radiation photons counted in each of the subpixels 16. If the pixel 15 includes a failed subpixel 16, the addition is made to the exclusion of the number of radiation photons in the failed subpixel 16. Furthermore, apart from the subpixel 16 in which a failure has been detected by the failure detection circuit 23, a subpixel 16 which has been previously specified as a failed subpixel by the arithmetic device 2 may be excluded from the addition.

The transmission buffer 25 sends the value after addition which the data addition circuit 24 has written, to the arithmetic device 2 through the slip ring 27. In other words, the number of radiation photons counted in each pixel 15 is transmitted to the arithmetic device 2.

The control circuit 26 controls the front-end IC 21, failure detection circuit 23 and data addition circuit 24 according to a command from the arithmetic device 2, and also stores various data. In addition, the control circuit 26 notifies the arithmetic device 2 of the position of the subpixel 16 in which a failure has been detected by the failure detection circuit 23, through the slip ring 27.

The arithmetic device 2 generates correction data by correcting the output signal of the pixel 15 including the failed subpixel 16 according to the position of the failed subpixel 16 and reconstructs an image using the generated correction data. In reconstructing an image, it is necessary to correct the deterioration in linearity, for example, due to variation in the sensitivity of pixels 15 or failing to perform counting or the like. The sensitivity data and linearity data that are previously measured to correct the sensitivity variation and linearity deterioration change when a failure occurs in a subpixel 16. The arithmetic device 2 functions as a data correction section that generates correction data for the pixel 15 including the failed subpixel 16 according to the position of the failed subpixel 16.

The correction data which is acquired during the manufacture of the X-ray CT device or periodic calibration is used to generate correction data for the pixel 15 including the failed subpixel 16. The correction data is acquired for each subpixel 16 by measuring the phantom whose material and shape are known or the air at each tube voltage or tube current of X rays. More specifically, correction data is acquired by enabling only one of the subpixels 16 included in the pixel 15 sequentially and repeating the measurement as many times as the number of subpixels 16. Alternatively, the number of radiation photons in each of the subpixels 16 may be acquired as correction data without addition by the data addition circuit 24.

According to the radiation imaging device in the first embodiment, a failure in a subpixel 16 is detected according to the number of radiation photons counted in each of the subpixels 16 and correction data for the pixel 15 is generated according to the position of the failed subpixel 16. Therefore, even if a subpixel fails during operation of the photon counting detector, the output signal of the pixel including the failed subpixel can be corrected so that a medical image without artifacts can be output.

The radiation imaging device according to the present invention is not limited to the above embodiment, but the constituent elements can be embodied in modified forms without departing from the gist of the invention. Some of the constituent elements disclosed in the above embodiment may be combined as appropriate. Furthermore, among all the constituent elements described in the above embodiment, some constituent elements may be omitted.

REFERENCE SIGNS LIST

1: gantry
2: arithmetic device
3: display device
4: bed
5: subject
6: X-ray tube
7: detector panel
8: input device
9: storage device
10: detector module
11: collimator
12: radiation detector
13: read electrode
14: high-voltage electrode
15: pixel
16: subpixel
20: data processing circuitry
21: front-end IC
22: data buffer
23: failure detection circuit
24: data addition circuit
25: transmission buffer
26: control circuit
27: slip ring
31: channel read circuit
32: charge amplifier
33: waveform shaping circuit
34: comparator
35: DAC
36: counter
37: data control circuit
38: data multiplexer
39: configuration circuit

What is claimed is:

1. A radiation imaging device comprising:
a photon counting detector that counts radiation photons, the photon counting detector comprising:

a pixel comprised of a plurality of subpixels;

a data processing section that calculates an output signal of the pixel according to a number of radiation photons counted in each of the subpixels; and a failure detection section that detects a failure of a subpixel amongst the subpixels according to the number of radiation photons counted in the subpixel and outputs a position of the failed subpixel; and a data correction section that generates correction data for the pixel including the failed subpixel according to the position of the failed subpixel, wherein the data correction section excludes the number of radiation photons counted in the failed subpixel, and the correction data is generated using previously-measured correction data that is previously measured for each subpixel.

2. The radiation imaging device according to claim 1, wherein, when the number of radiation photons counted in the subpixel is out of a predetermined normal range, the failure detection section detects a failure in the subpixel.

3. The radiation imaging device according to claim 1, wherein the failure detection section compares the number of radiation photons counted in a plurality of subpixels adjacent to a first subpixel with the number of radiation photons counted in the first subpixel and thereby detects a failure in the first subpixel.

4. The radiation imaging device according to claim 1, wherein, when a ratio of the number of radiation photons counted in the subpixel is out of a predetermined normal range, the failure detection section detects a failure in the subpixel.

5. A method performed by a radiation imaging device comprising:

counting radiation photons;

calculating an output signal of a pixel comprised of a plurality of subpixels according to a number of radiation photons counted in each of the subpixels; and detecting a failure of a subpixel amongst the subpixels according to the number of radiation photons counted in the subpixel, and outputting a position of the failed subpixel; and generating correction data for the pixel including the failed subpixel according to the position of the failed subpixel, including excluding the number of radiation photons counted in the failed subpixel, while the correction data is generated using previously-measured correction data that is previously measured for each subpixel.

6. The method according to claim 5, further comprising detecting a failure in the subpixel when the number of radiation photons counted in the subpixel is out of a predetermined normal range.

7. The method according to claim 5, further comprising:

comparing the number of radiation photons counted in a plurality of subpixels adjacent to a first subpixel with the number of radiation photons counted in the first subpixel; and detecting a failure in the first subpixel, based on a result of the comparison.

8. The method according to claim 5, further comprising detecting a failure in the subpixel when a ratio of the number of radiation photons counted in the subpixel is out of a predetermined normal range.

* * * * *